(12) United States Patent
Keller et al.

(10) Patent No.: US 10,866,487 B1
(45) Date of Patent: Dec. 15, 2020

(54) MONOLITHICALLY INTEGRATED WAVELENGTH CONVERTED PHOTONIC INTEGRATED CIRCUIT (PIC) AND HYBRID FABRICATION THEREOF

(71) Applicant: Raytheon Company, Waltham, MA (US)

(72) Inventors: Sean D. Keller, Tucson, AZ (US); Gerald P. Uyeno, Tucson, AZ (US); Benn Gleason, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/544,585

(22) Filed: Aug. 19, 2019

(51) Int. Cl.
*G02F 1/29* (2006.01)
*G02F 1/365* (2006.01)
*G02F 1/295* (2006.01)
*G02F 1/377* (2006.01)

(52) U.S. Cl.
CPC .............. *G02F 1/365* (2013.01); *G02F 1/292* (2013.01); *G02F 1/2955* (2013.01); *G02F 1/377* (2013.01)

(58) Field of Classification Search
CPC ........ G02F 1/292; G02F 1/295; G02F 1/2955; G02F 1/365; G02F 1/377; H01Q 3/2676
USPC ................ 385/5, 14, 37; 342/368, 371, 372; 398/115
See application file for complete search history.

(56) References Cited

U.S. PATENT DOCUMENTS

| | | | |
|---|---|---|---|
| 4,068,190 A | 1/1978 | Ferguson | |
| 5,165,004 A * | 11/1992 | Okamoto | G02F 1/065 359/332 |
| 5,333,000 A | 7/1994 | Hietala et al. | |
| 5,854,866 A * | 12/1998 | Leonard | G02B 6/2861 385/39 |
| 7,929,864 B2 * | 4/2011 | Chen | H01Q 3/2676 398/115 |
| 9,614,280 B2 | 4/2017 | Shi et al. | |
| 9,735,885 B1 * | 8/2017 | Sayyah | G02F 1/292 |
| 9,857,217 B2 * | 1/2018 | Wakatsuki | H01Q 3/2676 |
| 9,904,081 B2 | 2/2018 | Uyeno et al. | |
| 10,191,145 B2 * | 1/2019 | Swanson | G01S 7/4812 |
| 10,222,474 B1 * | 3/2019 | Raring | G01S 17/86 |
| 10,599,007 B2 * | 3/2020 | Stanton | G02F 1/377 |
| 2002/0131157 A1 * | 9/2002 | Ju | B82Y 20/00 359/332 |

(Continued)

OTHER PUBLICATIONS

Stulemeijer, J., "Photonic Integrated Beamformer for a Phased Array Antenna," ECOC '98, Sep. 20-24, 1998, Madrid Spain.

(Continued)

*Primary Examiner* — Robert Tavlykaev
(74) *Attorney, Agent, or Firm* — Schwegman Lundberg & Woessner, P.A.

(57) ABSTRACT

A monolithically integrated wavelength converted photonic integrated circuit (PIC) is fabricated by forming a trench in the PIC's insulating layer to expose a portion of an output waveguide that transmits a photonically processed optical signal at frequency $\omega 1$. A non-linear waveguide formed of a non-linear material with non-linear susceptibility at frequency $\omega 1$ and a transmission bandwidth spanning both $\omega 1$ and $m^*\omega 1$ where m is an integer of at least two is fabricated in direct physical contact with the exposed portion of the output waveguide. A patterned structure is fabricated in or on the non-linear waveguide to enhance non-linear susceptibility to generate an optical signal at frequency $m^*\omega 1$, which may be emitted directly or coupled to an optical antenna.

20 Claims, 10 Drawing Sheets

(56) References Cited

U.S. PATENT DOCUMENTS

| | | | | |
|---|---|---|---|---|
| 2012/0182544 A1* | 7/2012 | Asahara | ............... | G01S 7/499 |
| | | | | 356/73 |
| 2015/0277043 A1* | 10/2015 | Shimizu | ............ | G02B 6/12004 |
| | | | | 385/14 |
| 2016/0195676 A1* | 7/2016 | Yu | ..................... | G02B 6/107 |
| | | | | 385/11 |
| 2019/0391243 A1* | 12/2019 | Nicolaescu | .......... | G01S 7/4817 |
| 2020/0026148 A1* | 1/2020 | Stanton | ............... | G02B 6/1223 |

OTHER PUBLICATIONS

Behrooz et al., "A 21-D Heterodyne Lens-Free Optical Phased Array Camera with Reference Phase Shifting," ILLL Photonics Journal, vol. 10, No. 5, Sep. 2018.

Fatemi et al., "A Low Power PWM Optical Phased Array Transmitter with 16° Field-of-View and 0.8° Beamwidth," 2018 IEEE Radio Frequency Integrated Circuit Symposium.

Fatemi et al., "A Nonuniform Sparse 2-D Large-FOV Optical Phased Array With a Low-Power PWM Drive," 2019 IEEE, IEEE Journal of Solid State Circuits.

Analog Photonics, "APSUNY Process Development Kit Full-Build Component Library Documentation," Sponsored by AIM Photonics Institute, copyright 2017.

Kohno et al., "Ghost imaging using a large-scale silicon photonic phased array chip," Optics Express 3817, vol. 27, No. 3, Feb. 4, 2019.

Jung et al., "High efficiency low threshold current 1.3 μm InAs quantum dot lasers on on-axis (001) GaP/Si," Applied Physics Letters III, Dec. 21, 2007 (2017).

Barry et al., "Thermo-optical instabilities and bistable behavior with the frequency-doubled Nd :YAG laser," Journal of Applied Physics 48, 2518 (1977); https://doi.org/10.1063/1.323966 Published Online: Aug. 26, 2008.

Wang et al. "Metasurface-assisted phase-matching-free second harmonic generation in lithium niobate waveguides," Nature Communications | 8: 2098 | DOI: 10.1038/s41467-017-02189-6 | www.nature.com/naturecommunications, © The Author(s) Dec. 13, 2017.

\* cited by examiner

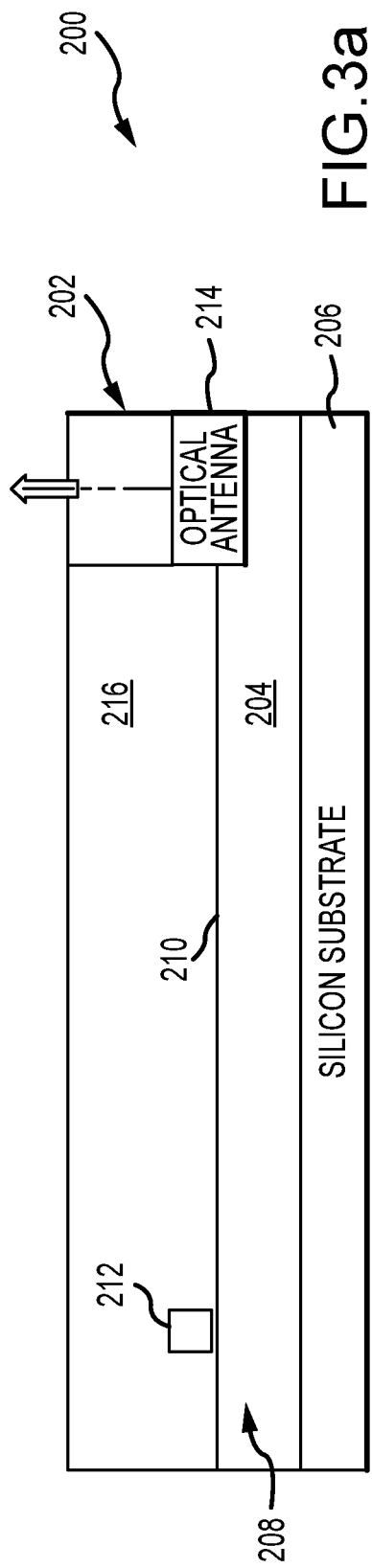
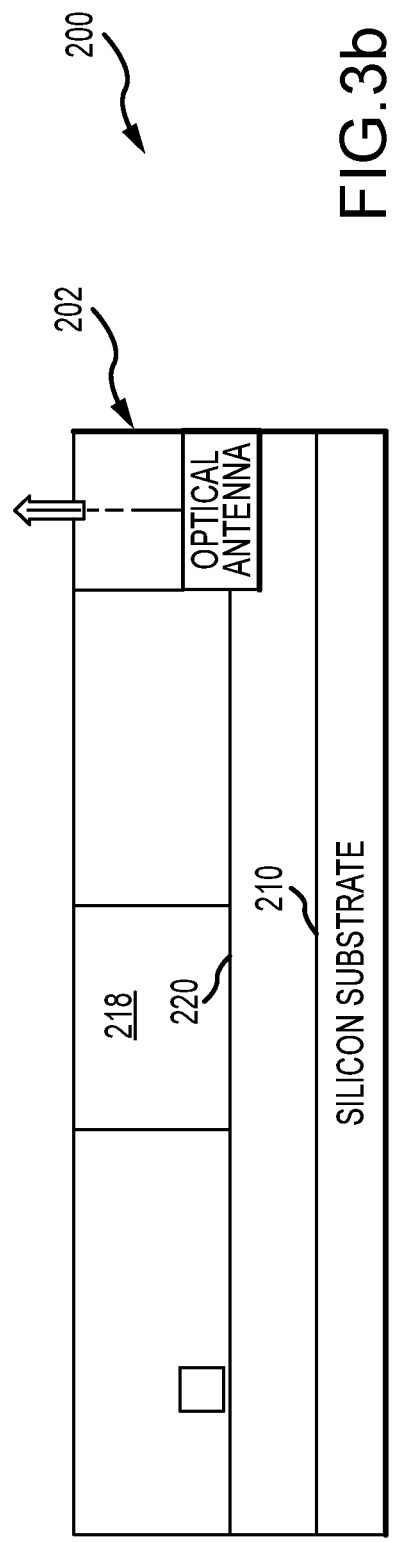
FIG.3a
FIG.3b

MONOLITHICALLY INTEGRATED WAVELENGTH CONVERTED PHOTONIC INTEGRATED CIRCUIT (PIC) AND HYBRID FABRICATION THEREOF

BACKGROUND OF THE INVENTION

Field of the Invention

This invention relates to photonic integrated circuits (PICs) and more particularly to the monolithic integration of wavelength conversion to provision optical bands not optimally supported by the PIC.

Description of the Related Art

A photonic integrated circuit (PIC) is a device that integrates multiple (at least two) photonic functions and as such is similar to an electronic integrated circuit. The major difference between the two is that a photonic integrated circuit provides functions for information signals imposed on optical wavelengths typically in the visible spectrum or near infrared 850 nm-1650 nm.

One of the most commercially utilized material platforms for photonic integrated circuits is indium phosphide (InP), which allows for the integration of various optically active and passive functions on the same chip. Initial examples of photonic integrated circuits were simple 2 section distributed Bragg reflector (DBR) lasers, consisting of two independently controlled device sections—a gain section and a DBR mirror section. Consequently, all modern monolithic tunable lasers, widely tunable lasers, externally modulated lasers and transmitters, integrated receivers, etc. are examples of photonic integrated circuits. Current state-of-the-art devices integrate hundreds of functions onto single chip Unlike electronic integration where silicon is the dominant material, system photonic integrated circuits have been fabricated from a variety of material systems, including electro-optic crystals such as lithium niobate, silica on silicon, Silicon on insulator (SOD, chalcogenides, various polymers, and semiconductor materials which are used to make semiconductor lasers such as GaAs and InP. The different material systems are used because they each provide different advantages and limitations depending on the function to be integrated. For instance, silica (silicon dioxide) based PICs have very desirable properties for passive photonic circuits such as array waveguide gratings or AWGs (see below) due to their comparatively low losses and low thermal sensitivity, GaAs or InP based PICs allow for optical gain and therefore the direct integration of light sources, Silicon PICs enable co-integration of the photonics with transistor based electronics, and chalcogenide PIC enable processing on non-rigid platforms in mid- and long-wave infrared wavelengths.

The fabrication techniques are similar to those used in electronic integrated circuits in which photolithography is used to pattern wafers for etching and material deposition. Unlike electronics where the primary device is the transistor, two main building blocks for PICs are resonators and optical modulators. The range of supplementary devices on a chip includes low loss interconnect waveguides, power splitters and combiners, optical amplifiers, filters, lasers and detectors. These devices require a variety of different geometries and fabrication techniques making it difficult to realize all of them on a single chip.

As shown in FIG. 1, a PIC 10 is configured as an optical phased array (OPA) 12. OPAs have received considerable attention due to the numerous applications they enable such as LiDAR, high-speed free-space point-to-point communications and sensing with compact and favorable form factors. A basic OPA architecture receives an optical signal 14 at frequency $\omega 1$ from a source 16 via a coupler 18. Optical signal 14 input to a 1-to-N optical waveguide splitter 20 ($1^{st}$ photonic function) that splits the signal into optical channel signals 22a, 22b, . . . 22n. N electro-optic phase modulators 24a, 24b, . . . 24n ($2^{nd}$ photonic function), responsive to computer-controlled steering commands, phase modulate the optical channel signals 22a, 22b, . . . 22n. These optical channel signals are carried on output waveguides 26a, 26b, . . . 26n and fed to N optical antennas 28a, 28b, . . . 28n (e.g., nano-antennas), which produce a steerable optical beam 30. In a phased array, the optical channel signals are fed to the individual antennas with the correct phase relationship so that the optical waves from the separate antenna add together to increase the radiation in a desired direction, while cancelling to suppress radiation in undesired directions.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a monolithically integrated wavelength converted photonic integrated circuit (PIC) and method of hybrid fabrication. A PIC is fabricated from a first material system and includes an optical feed network with an output waveguide configured to carry an output optical signal at frequency $\omega 1$ and at least two photonic circuits to interact with and perform at least two photonic functions on the optical signal. An insulating layer covers the optical feed network and photonic circuits. A trench is formed in the insulating layer to expose a portion of the output optical waveguide after all of the photonic processing. A wavelength converter is fabricated in the trench including a non-linear waveguide formed of a non-linear material with non-linear susceptibility at frequency $\omega 1$ and a transmission bandwidth spanning both $\omega 1$ and $m^*\omega 1$ where m is an integer of two or more in direct physical contact with the exposed portion of the output waveguide and a patterned structure in direct physical contact with the non-linear waveguide to enhance non-linear susceptibility to generate an optical signal at frequency $m^*\omega 1$.

In an embodiment, the first material system from which the PIC is fabricated exhibit a transmission bandwidth that supports waveguide confinement or photonic processing at the primary frequency of $\omega 1$ and is at least partially transmissive at the $m^{th}$ order harmonic of $m^*\omega 1$. Typical PIC materials include but are not limited to Si (1-2 micron transmission bandwidth), SiN (0.4-2 micron transmission bandwidth), III-V materials (0.5-2 micron transmission bandwidth), and Chalcogenides (3-10 micron transmission bandwidth).

In different embodiments, the non-linear material comprises a III-V material such as GaAs, GaN, InP, InSb etc. that exhibit a transmission bandwidth in the 0.5 to 2 micron range or LiNbO that exhibit a transmission bandwidth in the 0.5-5.0 micron range. The transmission bandwidth of the non-linear material must support the $m^{th}$ order harmonic frequency. The power level (or intensity) of the primary optical signal at ω1 must exceed a certain threshold to activate the non-linear mechanisms and generate the second harmonic. This threshold will in part depend on the specific non-linear material.

In an embodiment, the patterned structure on the non-linear waveguide is configured to emit the optical signal at frequency m*ω1. In another embodiment, the patterned structure is configured to minimize emission of the $m^{th}$ order harmonic. Another waveguide is formed of a third material (and third process) having a bandwidth that includes the $m^{th}$ order harmonic at m*ω1 to route the optical signal to an optical antenna configured to emit at m*ω1.

In an embodiment, the PIC's output waveguide is configured to intentionally allow optical power from the optical signal at ω1 into the non-linear layer to increase the optical power of the second harmonic optical signal at m*ω1. The output waveguide and/or the non-linear waveguide, may be "tapered" to shift additional optical power towards the non-linear waveguide.

In an embodiment, the residual optical signal at ω1 is directed to a signal dump. In another embodiment, the residual optical signal at ω1 is directed to an optical antenna. The primary and $m^{th}$ order harmonic optical signals may be emitted at the same time or multiplexed.

In an embodiment, the PIC includes two separate optical feed networks and processing circuits to route and process optical signals at two different frequencies ω1 and ω3 that fall within the bandwidth supported by the PIC. First and second wavelength converters are configured to generate the $m^{th}$ order harmonic optical signals for ω1 and ω3, respectively. The first and second wavelength converters may or may not be formed from the same non-linear materials. Each patterned structure will be specifically design for the respective $m^{th}$ order harmonic frequency.

In another embodiment, the primary frequency ω1 corresponds to a wavelength at 1310 nm with a second order harmonic frequency with a corresponding wavelength of 655 nm, the first material system for forming the PIC is Si and a second material system for forming the non-linear waveguide is a III-V material with one element selected from group III and one element selected from group V of the periodic table. In another embodiment, the primary frequency ω1 corresponds to a wavelength at 1550 nm with a second order harmonic frequency with a corresponding wavelength of 775 nm, the first material system for forming the PIC is Si and a second material system for forming the non-linear waveguide is a III-V material. In another embodiment, the primary frequency ω1 corresponds to a wavelength is in the 3-5 micron range with a second order harmonic frequency, the first material system for forming the PIC is within the GeAsSe material system and the non-linear waveguide is selected from the AsS or AsTe material system.

In an embodiment, the PIC is configured as an optical phased array (OPA), which includes a 1-to-n optical splitter ($1^{st}$ photonic function) and n optical phase modulators ($2^{nd}$ photonic function). A wavelength converter is fabricated on top of each of then output waveguides after all of photonic processing.

In an embodiment, the PIC, which is formed from a first material system, and the trench are formed in a foundry optimized for the first material. The PIC is then transferred to another foundry optimized for processing a different material system for the wavelength converter. On a commercial scale, processing of these different material systems is typically incompatible e.g. impurity levels that may contaminate the other process.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3a through 3d depict an embodiment of a hybrid fabrication of the monolithically integrated PIC of FIG. 2b;

DETAILED DESCRIPTION OF THE INVENTION

Figure 1:
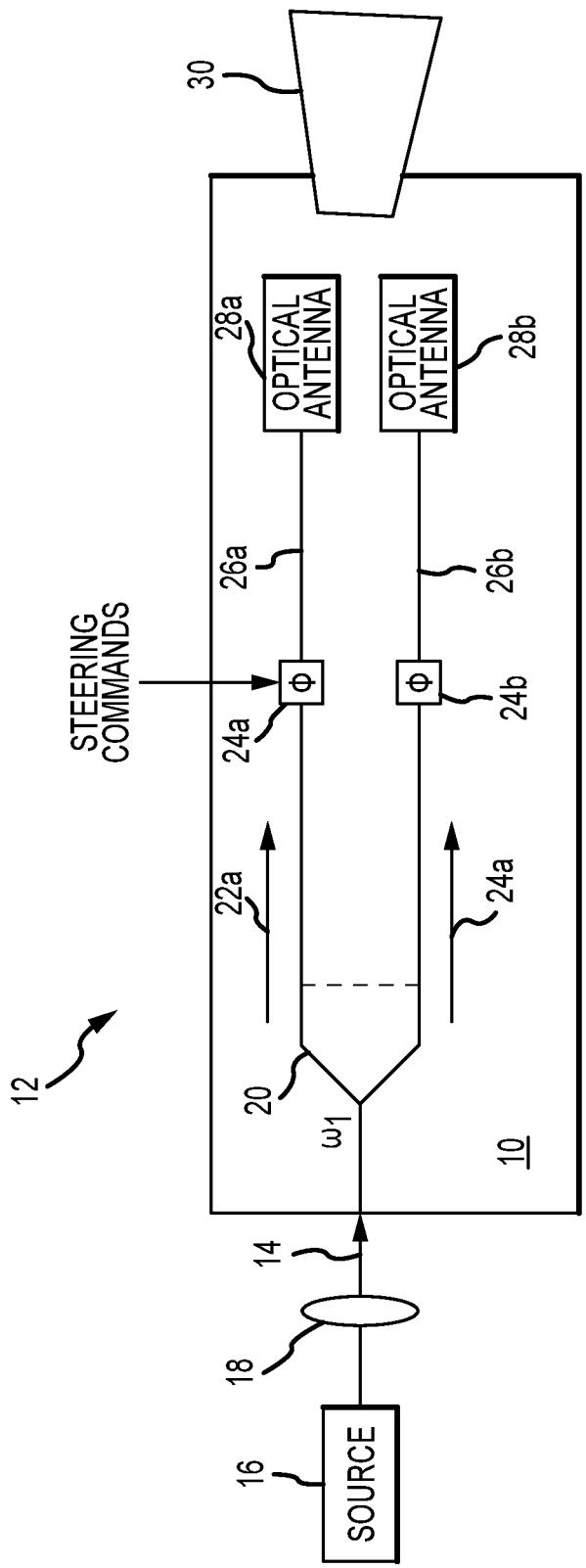
FIG. 1, as described above, is a depiction of a PIC that implements an optical phased array.

The present invention describes a monolithically integrated wavelength converted photonic integrated circuit (PIC) to provision optical bands not optimally supported by the underlying PIC. In other words, the PIC may be transmissive at these optical bands but the transmission percentage is too to low photonically process, route and transmit the optical signal without unacceptable losses.

As previously stated, photonic integrated circuits have been fabricated from a variety of material systems, including electro-optic crystals such as lithium niobate, silica on silicon, SOI, chalcogenides, various polymers, and semiconductor materials which are used to make semiconductor lasers such as GaAs and InP. These materials support different but limited transmission bands. The edges of the transmission band are defined by a specified minimum cut-off transmission e.g. 50%. Within the transmission band, losses due to absorption and reflection are small enough that transmission exceeds the minimum cut-off. Furthermore, there is an existing base of optical sources and couplers and popular wavelengths such as 1310 nm and 1550 nm that generate the optical signals that are processed by the PICs. There exists a need or desire to provision optical bands not supported by the existing material systems for the PICs or the optical sources or couplers. The PIC materials may be partially transmissive at wavelengths in these non-supported bands but not sufficiently transmissive for commercial application.

One approach would be to develop different material systems that address the desired optical bands for PICs and to develop new optical sources and couplers that cover these wavelengths. This may or may not be feasible, and would at a minimum require a considerable investment of time and money. Furthermore, the resulting PIC, source and coupler might be very expensive due to either the nature of the material systems or a limited demand to provision these optical bands.

Another approach would be to leverage the existing base of optical sources, couplers and PICs and convert the wavelength of the output optical signals to the desired band.

$M^{th}$ order harmonic generation is a nonlinear optical process, in which "m" photons with the same frequency interact with a nonlinear material and are effectively "combined" to generate one new photon with m times the energy where m is an integer of at least two, and therefore 1/m times the wavelength of the initial photons. A non-linear material has a higher "non-linear susceptibility", meaning this combination of m photons has a higher probability to occur in that material. The probability of generating an $m^{th}$ order harmonic increases as the power increases (part of the non-linearity). A nonlinear process in which the new photon has twice the frequency and half the wavelength of the two original photons is referred to as second harmonic generation (also called frequency doubling or abbreviated SHG). Higher order harmonic generation (third, fourth, ..., $m^{th}$) is also possible, but the probability of occurrence generally decreases with increasing order. Alternatively, the power required to generate higher order harmonics generally increases.

One possible configuration is to design the PIC to receive, photonically process and output the optical signal(s) at frequency ω1, free-space couple the optical signal to a discrete wavelength converter to generate optical signal(s) at frequency m*ω1 and free-space couple the frequency-multiplied optical signals to one or more optical antennas. There are bulk crystals formed from non-linear materials such as $Ba_2Na(NbO_3)_3$ that could perform the conversion. See for example, J. D. Barry et al. "Thermo-optical instabilities and bistable behavior with the frequency-doubled Nd:YAG laser" Journal of Applied Physics 48, 2518 (1977), U.S. Pat. No. 4,068,190 entitled "Laser System Having Frequency Doubling" and U.S. Pat. No. 9,904,081 entitled "LCWG Steered Laser Transmitter and Situational Awareness Sensor with Wavelength Conversion". Another approach is to treat the optical signal as a "pump" signal and pass it through a standard waveguide that supports transmission of frequency ω1 on which is formed a non-linear waveguide patterned with gradient metastructures as described in Cheng Wang et al. "Metasurface-assisted phase-matching-free second harmonic generation in lithium niobate waveguides", NATURE COMMUNICATIONS 8:2098, which is hereby incorporated by reference. The pump signal activates the non-linear mechanisms, which generate harmonic optical signals that are directly emitted from the metastructures. The metastructures are also designed to enhance the E-field in localized areas, which increases the likelihood of harmonic generation. Using the optical signal to "pump" the non-linear waveguide reduces coupling efficiency to approximately 1%. Because the optical signal passes directly through the bulk crystal it will be more efficient at converting optical power for emission in the harmonic signal. However, the primary drawback to this approach is the loss of monolithic integration associated with a PIC.

Accordingly, the present invention provides monolithic integration of a wavelength converted PIC using a hybrid fabrication process. A trench is etched in the insulating layer that covers a standard PIC to expose a portion of the output waveguide (post photonic processing). A non-linear waveguide is formed using a different process in direct physical contact with the exposed portion of the output waveguide. A patterned structure is formed in or on the non-linear waveguide to enhance non-linear susceptibility to generate an optical signal at frequency m*ω1 where m is an integer of at least two. In one embodiment, the patterned structure is configured to emit the $m^{th}$ order harmonic optical signal. In another embodiment, the patterned structure is configured to suppression emission of the $m^{th}$ order harmonic optical signal. In this case, another waveguide is fabricating using yet another process to transmit the $m^{th}$ order harmonic optical signal to an optical antenna. Although the power efficiency of the $m^{th}$ order harmonic optical signal suffers, this approach retains the monolithic integration of the wavelength converted PIC.

Without loss of generality the monolithic integration of wavelength conversion in a PIC and the hybrid fabrication of the PIC will be described in the context of an OPA for second order harmonic generation (m=2). The integrated structure and method of fabrication is applicable to any PIC that carries and photonically processes an optical signal at frequency ω1 to provision optical bands at m times the frequency or 1/m times the wavelength.

Figure 2A:
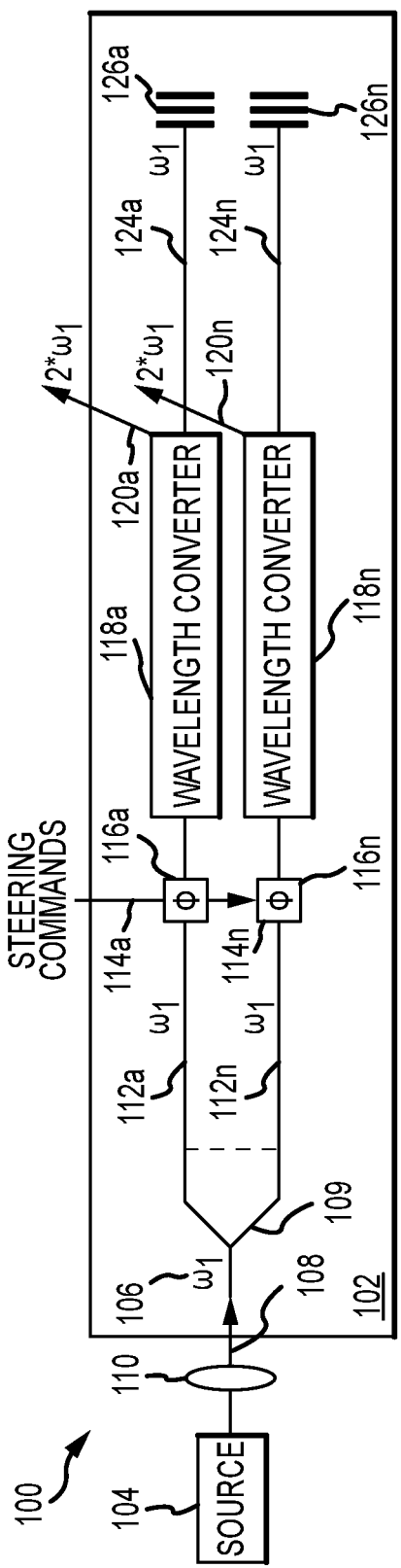
FIGS. 2a and 2b are embodiments of a monolithically integrated wavelength converted PIC that implements an optical phased array at twice the source frequency in which the source frequency is dumped or transmitted, respectively.
Figure 2B:
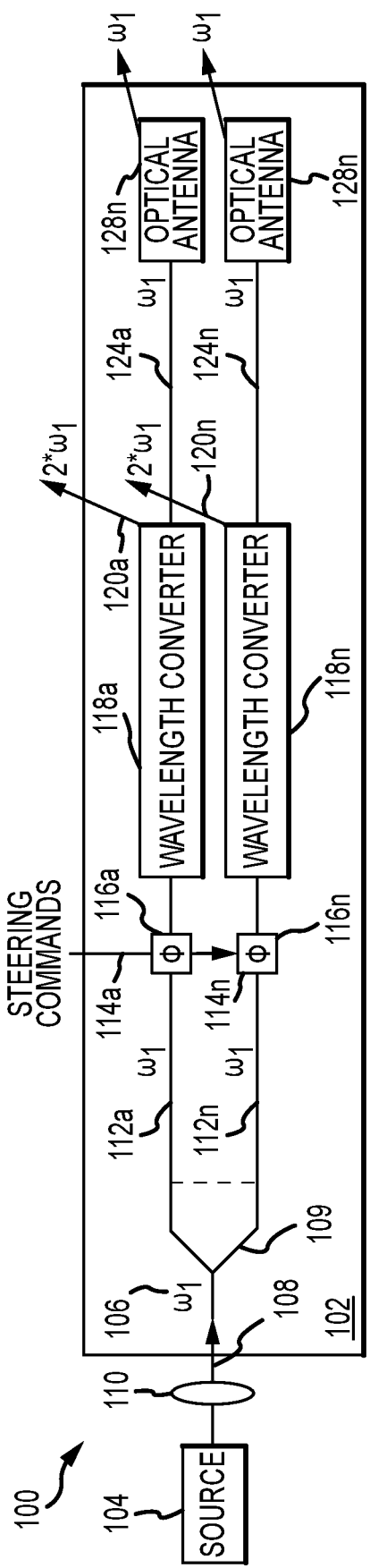

Referring now to FIGS. 2a and 2b, an OPA 100 is implemented on a PIC 102. In both configurations, a source 104 produces an optical signal 106 at frequency ω1 that is optically coupled to an input optical waveguide 108 on PIC 102 via a coupler 110. Optical signal 106 is fed to a 1-to-N optical waveguide splitter 109 (1t photonic function) that splits the signal into optical channel signals 112a, 112b, ... 122n at frequency ω1. N electro-optic phase modulators 114a, 114b, ... 114n ($2^{nd}$ photonic function), responsive to computer-controlled steering commands, phase modulate the optical channel signals 112a, 112b, ... 112n. These optical channel signals are carried on output waveguides 116a, 116b, ... 116n. This structure constitutes the underlying PIC 102 that is fabricated from a first material system such as Si. In some cases, the input, channel and output waveguides may be considered to be the same waveguide. The substrate is Si, the waveguides are doped Si (cladding index less than core index) to confine the optical signal at frequency ω1, any intermediate and covering insulating layers are Si oxide etc. Optical waveguides are typically designed to confine and preserve optical power at frequency ω1 to prevent leakage, hence loss of optical power. This portion of the hybrid fabrication is preferably performed in a Si foundry to optimize the properties of the Si PIC.

Wavelength converters 118a, 118b, ... 118n are fabricated in trenches in the covering insulating layer that expose portions of the output waveguides 116a, 116b, ... 116n after all of the photonic processing is done on the optical signal at frequency ω1. Each wavelength converter includes a non-linear waveguide formed of a non-linear material with non-linear susceptibility at frequency ω1 and a transmission bandwidth spanning both ω1 and 2*ω1 in direct physical contact with the exposed portion of the output waveguide and a patterned structure (e.g., metastructures) in direct physical contact with the non-linear waveguide to enhance non-linear susceptibility to generate and emit an optical signal 120a, 120b or 120n at frequency 2*ω1. Together the optical signals 120a, 120b or 120n form a steerable optical beam at frequency 2*ω1. This portion of the hybrid fabrication is preferably performed in a different foundry to optimize the properties of the non-linear waveguide. Separate foundries prevent or minimize impurity contamination.

In FIG. 2a, the residual optical channel signals 124a, 124b, ... 124n (energy not coupled into second harmonic generation) are directed to signal dumps 126a, 126b, ... 126n. In this configuration, PIC 102 only generates the steerable optical beam 122 at frequency $2*\omega 1$. In FIG. 2b, the residual optical channel signals 124a, 124b, ... 124n (energy not coupled into second harmonic generation) are directed to optical antennas 128a, 128b, ... 128n configured to emit at frequency $\omega 1$. In this configuration, PIC 102 simultaneously generates the steerable optical beam at frequency $2*\omega 1$ and a steerable optical beam at frequency $\omega 1$. The signal dumps and optical antenna are suitably fabricated of the Si material as part of the initial PIC fabrication.

Figure 3C:
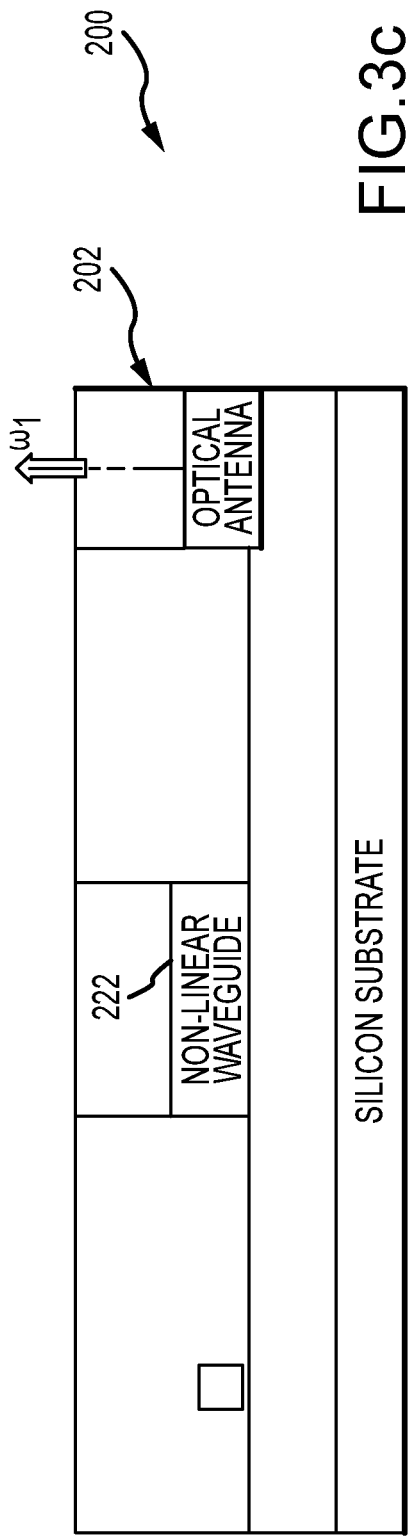

Referring now to FIGS. 3a-3d, an exemplary embodiment of hybrid fabrication of an embodiment monolithically integrated wavelength converted PIC 200 such as depicted in FIG. 2b is illustrated. As shown in FIG. 3a, a Silicon foundry is tasked to fabricate the underlying PIC 202 that implements an OPA at optical frequency $\omega 1$. In this section view, an electrical and thermal insulating layer 204 was fabricated onto a Silicon substrate 206. An optical feed network 208 including an output waveguide 210, an optical phase modulator 212 and an optical antenna 214 tuned to frequency $\omega 1$ were fabricated in Silicon on insulating layer 204. Another electrical and thermal insulating layer 216 was formed over the entire structure. The insulating layer 216 was etched to expose optical antenna 214 to facilitate emission at frequency $\omega 1$. Although not shown, the insulating layer 216 is also etched and metallization performed to form contacts to the optical phase modulator 212 to provide steering commands. This structure is suitably a fully functioning OPA at frequency $\omega 1$.

To implement the invention and monolithically integrate wavelength conversion into PIC 202 to form the wavelength converted PIC 200, a trench 218 is etched in insulating layer 216 to expose a portion of a top surface 220 of output waveguide 210. Preferably, the cladding of the output waveguide 210 is etched to expose the core of the output waveguide. A thin cladding could remain but would likely reduce SHG. The trench is suitably etched at the Silicon foundry.

The PIC 202 is suitably transferred to a different foundry that is optimized to process a given non-linear material, which is selected to exhibit non-linear susceptibility at frequency $\omega 1$ and a transmission bandwidth spanning both $\omega 1$ and $2*\omega 1$. Typical non-linear materials may include but are not limited to III-V materials such as GaAs, InAs, InSb, etc. or non-III-V materials such as LiNbO or AsS. A particular non-linear material is picked to best match the frequencies $\omega 1$ and $2*\omega 1$ and optimize SHG. For example, if PIC 202 is fabricated from Si or SiN for $\omega 1=1550$ nm, LiNbO may be used to form the non-linear waveguide to provide a transmission bandwidth that spans 1550 nm and 775 nm. If PIC 202 is fabricated from AsSe for $\omega 1=3000$-4000 nm, AsS may be used to form the non-linear waveguide to provide a transmission bandwidth that spans 3000-4000 nm and 1500-2000 nm. If PIC 202 is fabricated from Si or SiN for $\omega 1=1500$ nm, a III-V material such as GaAs may be used to form the non-linear waveguide to provide a transmission bandwidth that spans 1500 nm and 775 nm. These are but a few examples.

As shown in FIG. 3c, non-linear waveguide 222 is fabricated in trench 218 on the exposed portion of top surface 220 of output waveguide 210 (e.g. the surface of the waveguide core) of the non-linear material. Non-linear waveguide 222 includes a core surrounded by a cladding having a lower index of refraction.

Figure 3D:
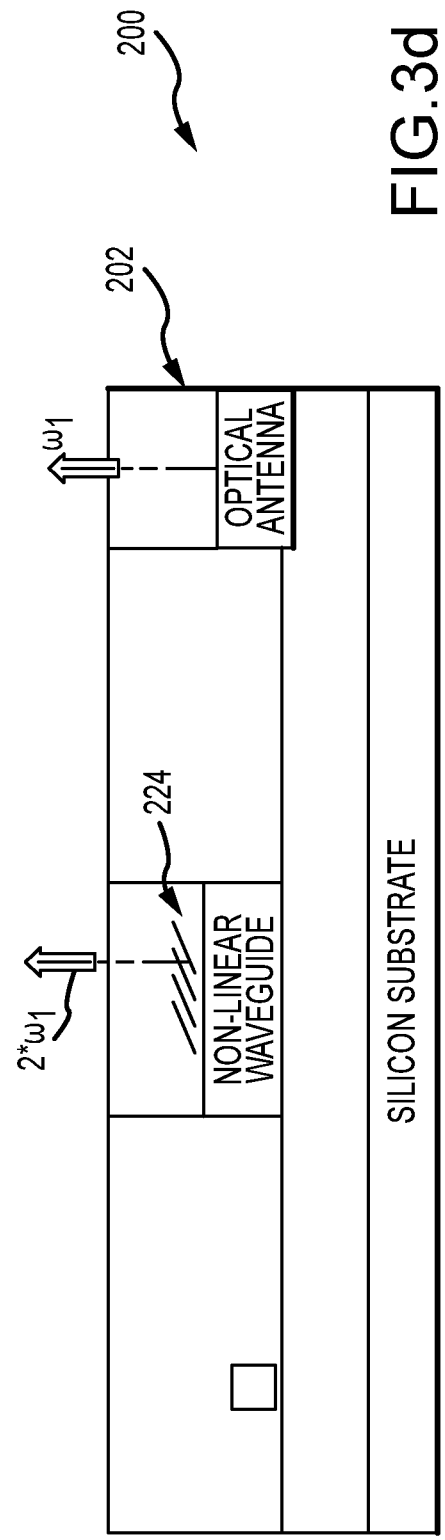

As shown in FIG. 3d, a patterned structure 224 is fabricated into or on top of non-linear waveguide 222 of the same or different material. Patterned structure 224 is configured to enhance non-linear susceptibility. Depending upon the embodiment, patterned structure 224 may also be configured to emit an optical signal at frequency $2*\omega 1$ essentially incorporating the optical antenna into the wavelength converter or patterned structure 224 may be configured to suppress or minimize any such emission. In this case, another waveguide is fabricated to confine the optical signal at frequency $2*\omega 1$ and route the optical signal to a discrete optical antenna designed to emit at frequency $2*\omega 1$.

Figures 4A, 4B:
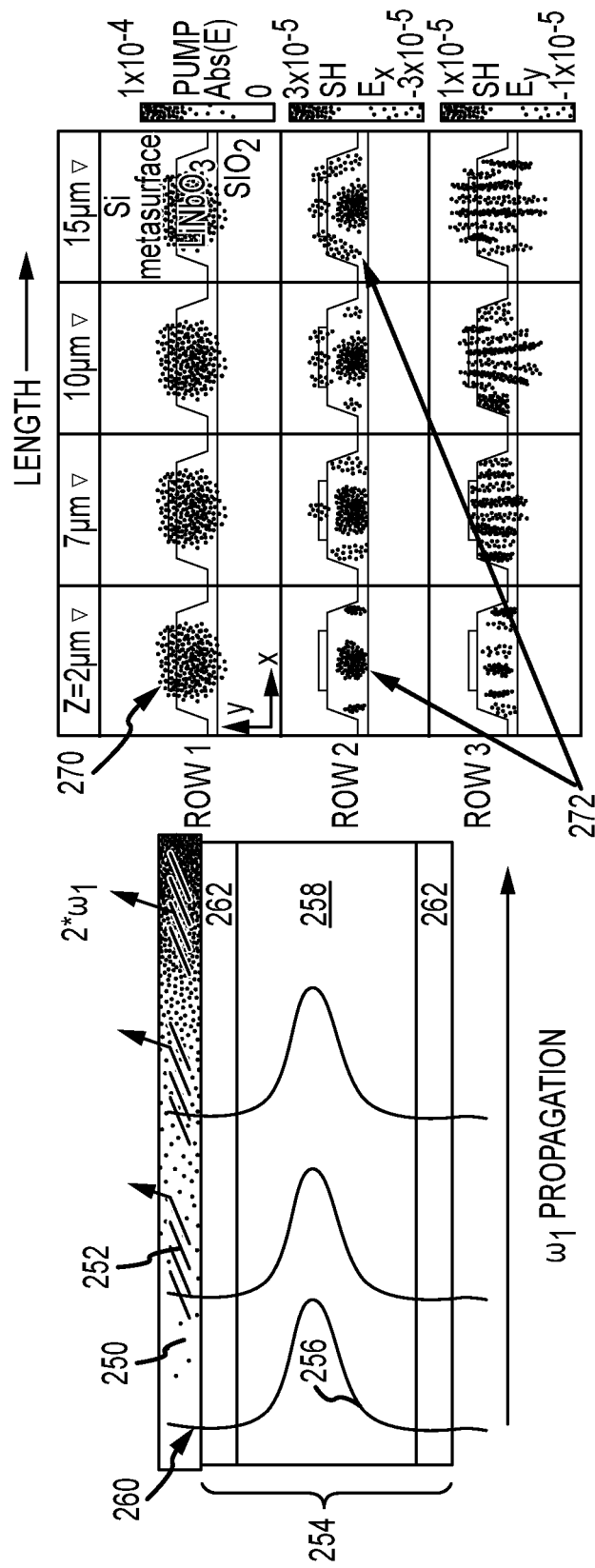
FIGS. 4a and 4b depict the propagation of the optical signal at frequency ω1 in the PIC's output waveguide and the coupling of optical energy into the non-linear waveguide to produce an optical signal at frequency 2*ω1.

Referring now to FIGS. 4a-4b, the non-linear susceptibility of a non-linear waveguide 250 and patterned structure 252 placed in direct physical contact with an output waveguide 254 that transmits an optical signal at frequency $\omega 1$ that causes SHG and emission of an optical signal at frequency $2*\omega 1$ is illustrated. As shown in FIG. 4a, the optical signal at frequency $\omega 1$ has an essentially Gaussian power distribution 256 that is centered in a core 258 of output waveguide 254. Although the typical output waveguide 256 is designed to maximize confinement of the optical power (minimize leakage and loss), the tails 260 of the power distribution 256 extend into and overlap both the cladding 262 of the output waveguide 256 and the non-linear waveguide 250 and patterned structure 252. In this basic configuration, only about 1% of the optical power may be converted to $2*\omega 1$ by the non-linear structures. This represents a 20 dB loss, which can be tolerated in systems with 40-50 dB or more of dynamic range.

As shown in FIG. 4b, the rows represent the absorption of $\omega 1$, the SHG of $2*\omega 1$, and the SHG of the horizontal and vertical polarization components of $2*\omega 1$, respectively, and the columns illustrate the parameters at lengths along the output and non-linear waveguides at 2, 7, 10 and 15 microns, respectively. As shown in row 1, the absorption 270 of the optical signal at frequency $\omega 1$ remains essentially constant, losing approximately 1% of the power. As shown in row 2, the SHG of $2*\omega 1$ 272 starts immediately within the output waveguide 256, grows in intensity as the optical signal propagates down the waveguide and is coupled into the non-linear waveguide 250 and patterned structure 252 and emitted. $\omega 1$ and $2*\omega 1$ are both in the output waveguide because there is efficient nonlinear overlap between the two fundamental waveguide modes over the cross section. This is why the material used to fabricate the PIC output waveguide must be at least partially transmissive at $2*\omega 1$ to allow SHG to start and grow within the output waveguide before the SHG is coupled to the non-linear waveguide.

In a standard PIC based transmit array, the output waveguide geometry is configured to optimize confinement and transmission of the optical signal at frequency $\omega 1$ (i.e. minimize leakage or loss outside the output waveguide) to maximize the optical power delivered to the optical antenna. Accordingly, the output waveguide, core and cladding, has a uniform cross-section along the length of the waveguide.

However, in certain embodiments of the wavelength converted PIC it may be desirable to increase the optical power coupled into the non-linear waveguide to increase the power of the SHG. To accomplish this, we design the output waveguide and/or non-linear waveguide to degrade the confinement capability of the output waveguide, make it intentionally "leaky". At least one of the output waveguide and non-linear waveguide is configured to shift optical power in the output optical signal at frequency $\omega 1$ towards the non-linear waveguide to couple more power into the optical signal at frequency $2*\omega1$. This may be accomplished by "tapering" the output waveguide and/or the non-linear waveguide as shown in different embodiments in FIGS. 5a-5c. Alternately, the waveguides may be tapered from a small cross-section to a larger one, only the non-linear waveguide is tapered, the optical waveguide tapers in one direction with an inverse taper on the non-linear waveguide. In another embodiment, a resonant structure such as a ring/disk resonator formed from the non-linear material that supports the patterned structure to 'trap' light at resonance. Other configurations may be developed to improve coupling of light out of the output waveguide into the non-linear waveguide.

Figure 5B:
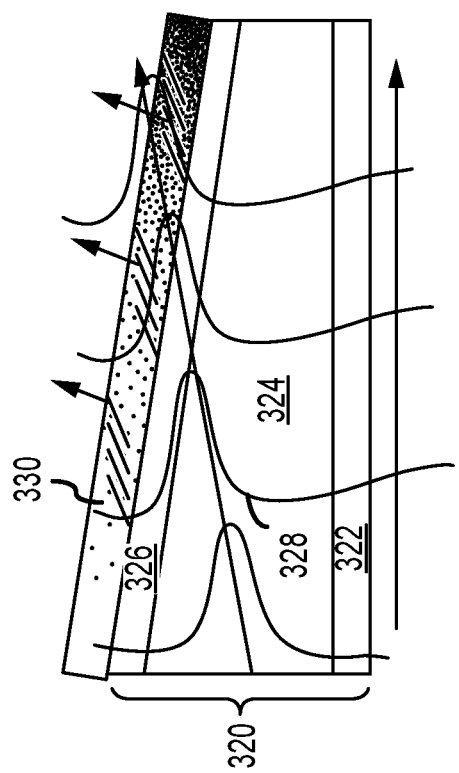
FIGS. 5a through 5c depict different tapered embodiments of the output and/or non-linear waveguide designed to increase the amount of optical energy coupled to the non-linear waveguide.
Figure 5A:
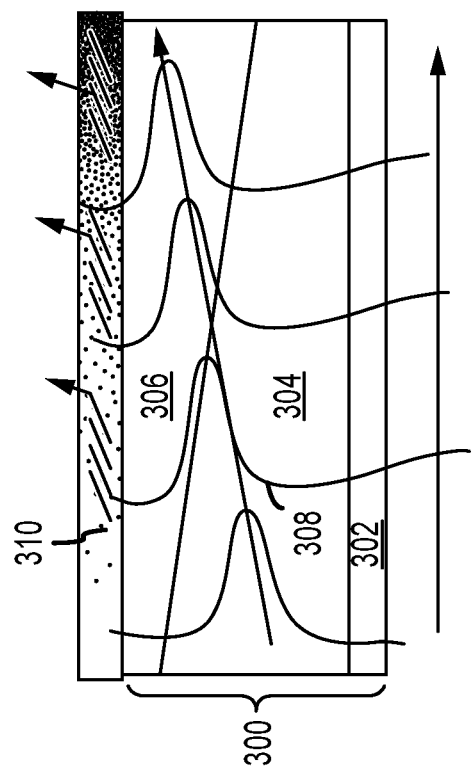

As shown in FIG. 5a, in an embodiment an output waveguide 300 includes a bottom cladding layer 302 having a uniform cross-section with length, a core 304 having a cross-section that tapers from larger to smaller with length, and a top cladding layer 306 having a cross-section with an inverse taper such that the cross-section of the entire output waveguide is uniform with length. This taper causes the Gaussian power distribution 308 to shift away from the centerline of the output waveguide towards the non-linear waveguide 310 having the desired result of coupling a higher percentage of optical power into the non-linear waveguide and SHG.

As shown in FIG. 5b, in an embodiment an output waveguide 320 includes a bottom cladding layer 322 having a uniform cross-section with length, a core 324 having a cross-section that tapers from larger to smaller with length, and a top cladding layer 326 having a uniform cross-section. The non-linear waveguide 330 is parallel to the top cladding layer 326. This taper causes the Gaussian power distribution 328 to shift away from the centerline of the output waveguide towards the non-linear waveguide 330 having the desired result of coupling a higher percentage of optical power into the non-linear waveguide and SHG.

Figure 5C:
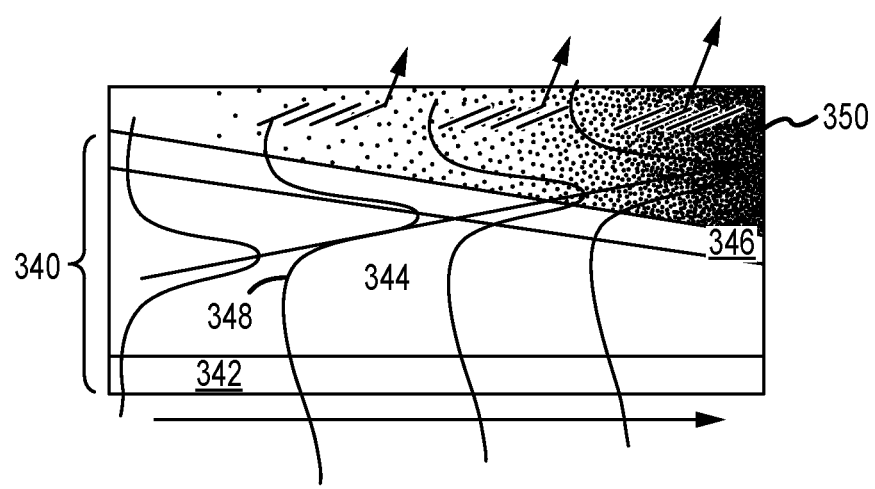

As shown in FIG. 5c, in an embodiment an output waveguide 340 includes a bottom cladding layer 342 having a uniform cross-section with length, a core 344 having a cross-section that tapers from larger to smaller with length, and a top cladding layer 346 having a uniform cross-section. The non-linear waveguide 350 has a cross-section with an inverse taper to the core 344. This taper causes the Gaussian power distribution 348 to shift away from the centerline of the output waveguide towards the non-linear waveguide 350 having the desired result of coupling a higher percentage of optical power into the non-linear waveguide and SHG.

Figure 6:
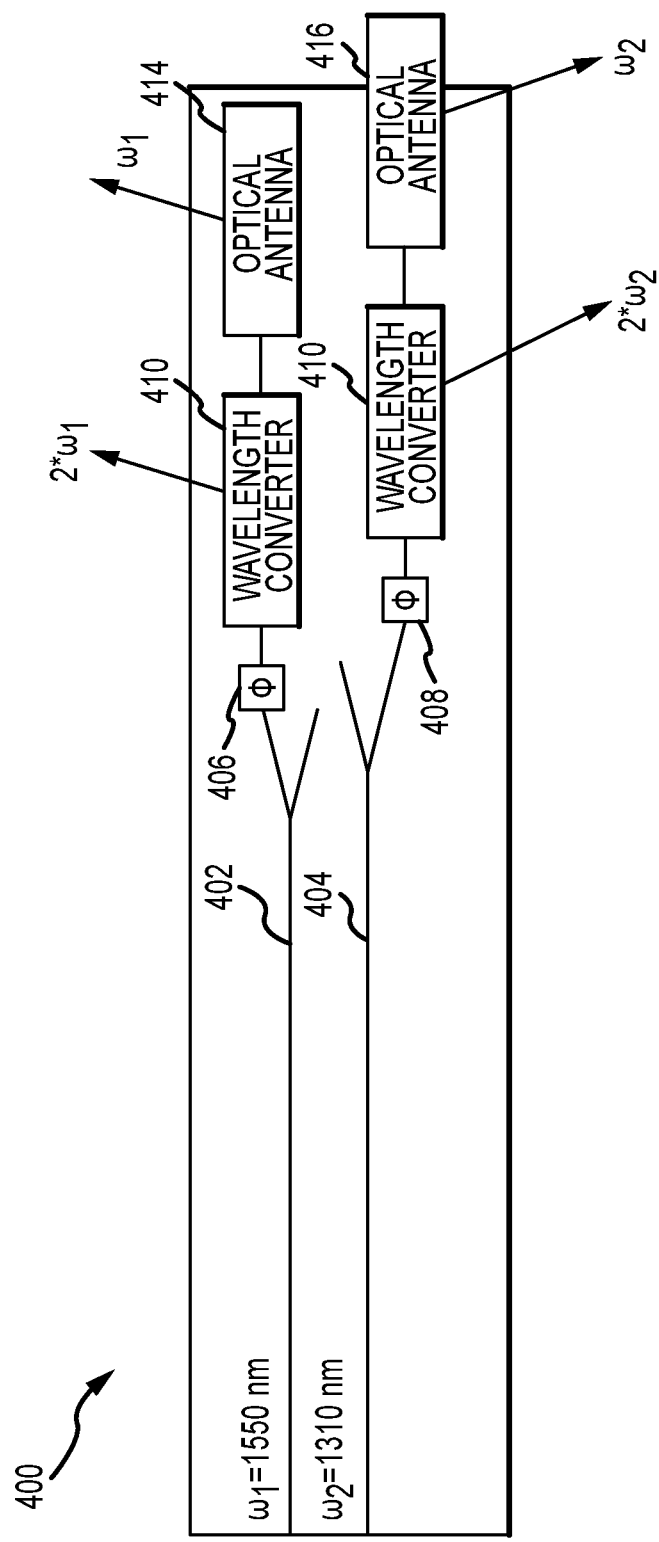
FIG. 6 is an embodiment of a monolithically integrated wavelength converted PIC configured to provision two different optical bands not supported by the PIC.

Referring now to FIG. 6, a wavelength converted PIC 400 is configured to support two different native frequencies $\omega1$ and $\omega2$ that lie within the transmission bandwidth of the material used to fabricate the PIC. In this example, $\omega1=1550$ nm and $\omega2=1310$ nm. Optical feed networks 402, 404 and photonic circuits 406, 408 are fabricated from the same material to support transmission and at least two photonic functions on both $\omega1$ and $\omega2$. Trenches are etched in the insulating layer to exposed portions of the respective output waveguides. Wavelength converters 410, 412 are fabricated in the trenches in direct physical contact with the exposed portions of the respective output waveguides. Each wavelength converter is tailored for the fundamental frequency of $\omega1$ or $\omega2$. Most likely the wavelength converters use different non-linear materials to best match the fundamental and SHG. More generally, one wavelength converter could generate an $l^{th}$ order optical signal and the other wavelength converter could generate a $p^{th}$ order optical signal where integers l and p may more may not have the same value. Furthermore, the patterned structures are specifically configured for the associated frequencies. In this configuration, the residual fundamental frequencies $\omega1$ and $\omega2$ are directed to optical antennas 414, 416, respectively, rather than being dumped. As a result, the single PIC 400 can transmit optical signals at four different frequencies.

Figure 7:
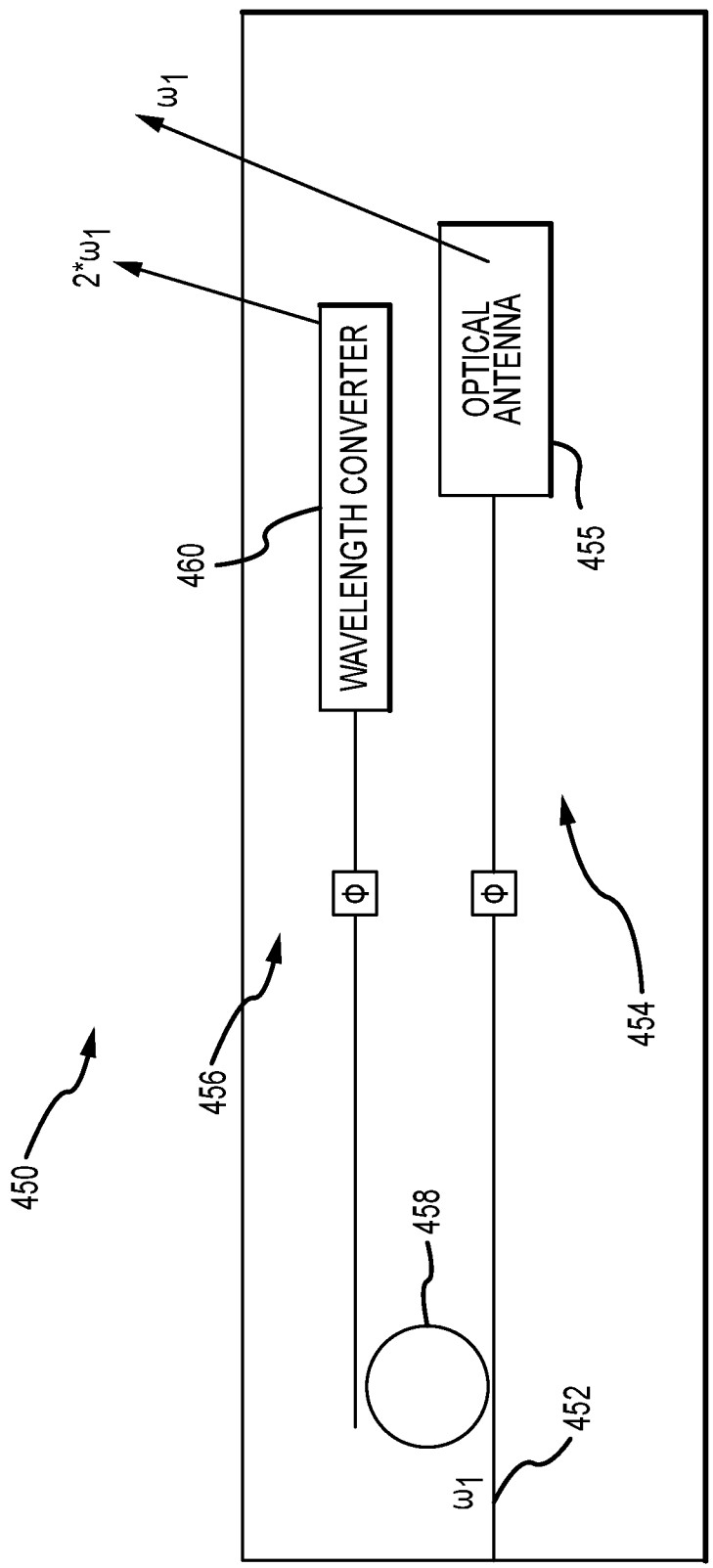
FIG. 7 is an embodiment of a monolithically integrated wavelength converted PIC configured to switch transmission of the optical signal between frequency ω1 and frequency 2*ω1.

Referring now to FIG. 7, a wavelength converted PIC 450 includes an input waveguide 452 configured to transmit an optical signal at frequency $\omega1$, an $\omega1$ channel 454 configured to phase modulate and emit the $\omega1$ optical signal via optical antenna 455, a $2*\omega1$ channel 456 configured to phase modulate the $\omega1$ optical signal, frequency-double the optical signal and emit the $2*\omega1$ optical signal and an optical switch 458 to alternately direct the optical signal between the $\omega1$ and $2*\omega1$ channels 454 and 456, respectively. All of elements except the wavelength converter 460 are fabricated as part of the standard PIC. Only the wavelength converter is fabricated using a different material process.

Figure 8:
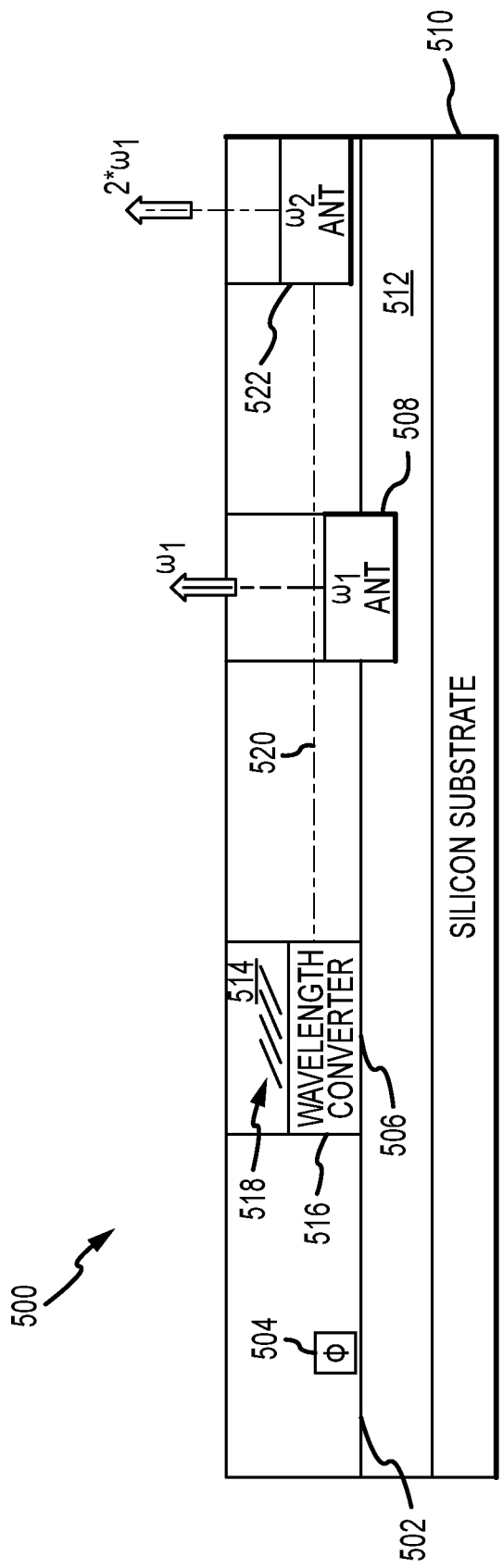
FIG. 8 is an embodiment of a monolithically integrated wavelength converted PIC configured to route the optical signal at frequency 2*ω1 to a separate optical antenna.

Referring now to FIG. 8, a wavelength converted PIC 500 includes an input waveguide 502 configured to transmit an optical signal at frequency $\omega1$, an optical phase modulator 504 to phase modulate the optical signal at frequency $\omega1$, and an output waveguide 506 to carry the phase modulated optical signal at frequency $\omega1$ to an optical antenna 508 configured to emit at frequency $\omega1$. In this embodiment, these elements are fabricated from Silicon on a silicon substrate 510 within thermal and electrical insulating layers 512. A trench 514 is etched in the insulating layer 512 to expose a portion of output waveguide 506, suitably to the surface of the core. Another material process such as a III-V material is used to fabricate a wavelength converter 516 in direct physical contact with the exposed portion of the output waveguide. In this particular embodiment, the patterned structure 518 is configured for SHG but to suppress or minimize direct emission of the second harmonic optical signal. Instead, a material process is used to fabricate an optical waveguide 520 to transmit the second harmonic optical signal at $2*\omega1$ to an optical antenna 522 configured to emit at frequency $2*\omega1$. This may involve a third different material process to form optical waveguide 520 for optimum transmission.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A monolithically integrated wavelength converted photonic integrated circuit (PIC), comprising:
a PIC including monolithically fabricated from a first material system,
an optical feed network including an input optical waveguide configured to receive an input optical signal at frequency $\omega1$ and an output optical waveguide configured to carry an output optical signal at frequency $\omega1$;
at least two photonic circuits coupled to the optical feed network to interact with and perform at least two photonic functions on the input optical signal to form the output optical signal at frequency $\omega1$; and
an insulating layer over the optical feed network and at least two photonics circuits,
a trench formed in the insulating layer to expose a portion of the output optical waveguide; and a wavelength converter in the trench above the output optical waveguide, said wavelength converter including,
a non-linear waveguide formed of a non-linear material from a second material system with non-linear susceptibility at frequency ω1 and a transmission bandwidth spanning both ω1 and m*ω1 where m is an integer of at least two, said non-linear material in direct physical contact with the exposed portion of the output optical waveguide to couple optical power from the output optical waveguide upwards into the non-linear waveguide; and
a patterned structure in direct physical contact with the non-linear waveguide to enhance non-linear susceptibility to generate an optical signal at a single frequency m*ω1.

2. The monolithically integrated wavelength converted PIC of claim 1, wherein the first material system has a transmission bandwidth that includes frequency ω1 and is at least partially transmissive at frequency m*ω1.

3. The monolithically integrated wavelength converted PIC of claim 1, wherein the intensity of the output optical signal at frequency ω1 at the non-linear waveguide exceeds a minimum activation threshold to generate the optical signal at frequency m*ω1.

4. The monolithically integrated wavelength converted PIC of claim 1, wherein the patterned structure is configured to emit the optical signal at frequency m*ω1.

5. The monolithically integrated wavelength converted PIC of claim 1, wherein the patterned structure is configured to suppress emissions of the optical signal at frequency m*ω1, further comprising:
a waveguide configured to carry the optical signal at frequency m*ω1; and
an optical antenna configured to emit the optical signal at frequency m*1.

6. The monolithically integrated wavelength converted PIC of claim 1, wherein at least one of the output optical waveguide and the non-linear waveguide is configured to shift optical power in the output optical signal at frequency ω1 upwards towards the non-linear waveguide to couple more power into the optical signal at frequency m*ω1.

7. The monolithically integrated wavelength converted PIC of claim 6, wherein at least one of the output optical waveguide and the non-linear waveguide exhibit a tapered cross-section to increase coupling of optical power from the output optical waveguide to the non-linear waveguide.

8. The monolithically integrated wavelength converted PIC of claim 1, further comprising a signal dump coupled to a distant end of the output optical waveguide to absorb any remaining optical power propagating in the output optical waveguide after the wavelength converter.

9. The monolithically integrated wavelength converted PIC of claim 1, wherein the patterned structure is configured to emit the optical signal at frequency m*ω1, further comprising an optical antenna coupled to the output optical waveguide to emit the output optical signal at frequency ω1 simultaneously with the emission of the optical signal at frequency m*ω1.

10. The monolithically integrated wavelength converted PIC of claim 1, wherein the patterned structure is configured to emit the optical signal at frequency m*ω1, further comprising:
an optical antenna coupled to the output optical waveguide to emit the output optical signal at frequency ω1; and
a switch to selectively redirect the output optical signal at frequency ω1 between the output optical waveguide and the optical antenna to time multiplex emission of the optical signals at frequency m*ω1 and frequency ω1.

11. The monolithically integrated wavelength converted PIC of claim 1, wherein the PIC includes a second optical feed network including a second input optical waveguide configured to receive an input optical signal at frequency ω2 and a second output optical waveguide configured to carry an output optical signal at frequency ω2 and at least two second photonic circuits coupled to the second optical feed network to interact with and perform at least two photonic functions on the input optical signal to form the output optical signal at frequency ω2, wherein frequencies ω1 and ω2 are different and within the transmission bandwidth of the first material system, further comprising:
a second trench formed in the insulating layer to expose a portion of the second output optical waveguide; and
a second wavelength converter in the second trench including,
a second non-linear waveguide formed, in direct physical contact with the exposed portion of the second output optical waveguide, of a second non-linear material with non-linear susceptibility at frequency ω2 and a transmission bandwidth spanning both ω2 and p*ω2 where p is an integer of at least two; and
a second patterned structure in direct physical contact with the non-linear waveguide to enhance non-linear susceptibility to generate an optical signal at frequency p*ω2.

12. The monolithically integrated wavelength converted PIC of claim 1, wherein the PIC is configured as an optical phased array in which a first photonic circuit is a 1-to-n splitter that splits the input optical signal into n channel signals and the second photonic circuit comprises n optical modulators that modulate a phase of each channel signal, respectively, to form n output signals at frequency ω1 in n different output optical waveguides, n trenches formed in the insulating layer to expose portions of the n output optical waveguides, and n wavelength converters positioned in the trenches in direct physical contact with the exposed portions of the n output optical waveguides to generate n phase-modulated optical signals at m*ω1 that are emitted to form a steerable optical beam.

13. The monolithically integrated wavelength converted PIC of claim 1, wherein m=2.

14. A monolithically integrated wavelength converted photonic integrated circuit (PIC), comprising:
an optical feed network (OFN) formed from a first material system, said OFN including an input optical waveguide configured to receive an input optical signal at frequency ω1 and an output optical waveguide having a transmission bandwidth configured to carry an output optical signal at frequency ω1 and at least partially transmissive at frequency m*ω1 where m is an integer of at least two;
at least two photonic circuits coupled to the optical feed network to interact with and perform at least two photonic functions on the input optical signal to form the output optical signal at frequency ω1;
a non-linear waveguide formed of a non-linear material from a second material system with non-linear susceptibility at frequency ω1 and a transmission bandwidth spanning both ω1 and m*ω1 and placed above and in direct physical contact with the output optical waveguide to couple optical power from the output optical waveguide upwards into the non-linear waveguide; and a patterned structure in direct physical contact with the non-linear waveguide to enhance non-linear susceptibility to generate an optical signal at a single frequency m*ω1.

15. A method of hybrid fabrication of a monolithically integrated wavelength converted photonic integrated circuit (PIC), the method comprising:

fabricating a PIC from a first material system including an optical feed network including an input optical waveguide configured to receive an input optical signal at frequency ω1 and an output optical waveguide configured to carry an output optical signal at frequency ω1, at least two photonic circuits coupled to the optical feed network to interact with and perform at least two photonic functions on the input optical signal to form the output optical signal at frequency ω1, and an insulating layer over the optical feed network and at least two photonics circuits, fabricating a trench in the insulating layer of the PIC to expose a portion of the output optical waveguide; and fabricating a wavelength converter in the trench above the output optical waveguide, said wavelength converter including a non-linear waveguide formed of a non-linear material from a second material system with non-linear susceptibility at frequency ω1 and a transmission bandwidth spanning both ω1 and m*ω1 where m is an integer of at least two, said non-linear material in direct physical contact with the exposed portion of the output optical waveguide to couple optical power from the output optical waveguide upwards into the non-linear waveguide and fabricating a patterned structure in direct physical contact with the non-linear waveguide to enhance non-linear susceptibility to generate an optical signal at a single frequency m*ω1.

16. The method of claim 15, wherein the first material system has a transmission bandwidth that includes frequency ω1 and is at least partially transmissive at frequency m*ω1.

17. The method of claim 15, wherein the intensity of the output optical signal at frequency ω1 at the non-linear waveguide exceeds a minimum activation threshold to generate the optical signal at frequency m*ω1.

18. The method of claim 15, wherein the patterned structure is configured to suppress emissions of the optical signal at frequency m*ω1, further comprising:

fabricating a waveguide on the PIC configured to carry the optical signal at frequency m*ω1; and fabricating an optical antenna on the PIC configured to emit the optical signal at frequency m*ω1.

19. The method of claim 15, wherein at least one of the output optical waveguide and the non-linear waveguide is configured to shift optical power in the output optical signal at frequency ω1 towards the non-linear waveguide to couple more power into the optical signal at frequency m*ω1.

20. The method of claim 15, wherein the patterned structure is configured to emit the optical signal at frequency m*ω1, further comprising an optical antenna coupled to the output optical waveguide to emit the output optical signal at frequency ω1.

* * * * *

UNITED STATES PATENT AND TRADEMARK OFFICE
CERTIFICATE OF CORRECTION

PATENT NO. : 10,866,487 B1
APPLICATION NO. : 16/544585
DATED : December 15, 2020
INVENTOR(S) : Keller et al.

Page 1 of 1

It is certified that error appears in the above-identified patent and that said Letters Patent is hereby corrected as shown below:

In the Drawings

Sheet 1 of 10, Fig. 1, delete "24a" and insert --22b-- therefor

In the Specification

In Column 1, Line 36, before "single", insert --a--

In Column 1, Line 37, after "chip", insert --.--

In Column 1, Line 42, delete "(SOD," and insert --(SOI),-- therefor

In Column 3, Line 61, delete "then" and insert --the n-- therefor

In Column 6, Line 32, delete "(1$t$" and insert --(1$^{st}$-- therefor

In the Claims

In Column 11, Line 37, in Claim 5, delete "m*l." and insert --m*ω1.-- therefor

Signed and Sealed this
Seventh Day of September, 2021

Drew Hirshfeld
*Performing the Functions and Duties of the
Under Secretary of Commerce for Intellectual Property and
Director of the United States Patent and Trademark Office*